United States Patent [19]

Yu

[11] Patent Number: 5,266,674
[45] Date of Patent: Nov. 30, 1993

[54] PROCESS FOR PREPARING ARYLENE SULFIDE COPOLYMERS

[75] Inventor: Michael C. Yu, Bartlesville, Okla.

[73] Assignee: Phillips Petroleum Company, Bartlesville, Okla.

[21] Appl. No.: 632,825

[22] Filed: Dec. 24, 1990

[51] Int. Cl.$^5$ .................. C08G 75/02; C08G 75/10; C08G 75/20

[52] U.S. Cl. .................. 528/226; 528/244; 528/265; 528/389; 528/391

[58] Field of Search .................. 524/424, 186, 494; 528/226, 244, 265, 389, 388, 391

[56] References Cited

U.S. PATENT DOCUMENTS

| 3,987,016 | 10/1976 | Haddad et al. | 528/374 |
|---|---|---|---|
| 4,016,145 | 4/1977 | Campbell | 528/390 |
| 4,070,349 | 1/1978 | Campbell | 528/398 |
| 4,301,274 | 11/1981 | Campbell | 528/388 |
| 4,440,915 | 4/1984 | Asakura et al. | 525/537 |
| 4,451,640 | 5/1984 | Shiiki et al. | 528/265 |
| 4,486,578 | 12/1984 | Asakura et al. | 525/535 |
| 4,605,732 | 8/1986 | Heitz et al. | 528/388 |
| 4,680,224 | 7/1987 | O'Connor | 428/294 |
| 4,774,276 | 9/1988 | Bobsein et al. | 524/399 |
| 4,792,481 | 12/1988 | O'Connor et al. | 428/288 |
| 4,795,799 | 1/1989 | Cleary | 528/222 |
| 4,808,698 | 2/1989 | Bobsein et al. | 528/388 |
| 4,812,552 | 3/1989 | Cliffton et al. | 528/226 |
| 4,814,224 | 3/1989 | Geibel et al. | 428/252 |
| 5,045,251 | 9/1991 | Johnson | 264/40.2 |

FOREIGN PATENT DOCUMENTS 0351136  1/1990  European Pat. Off. .

Primary Examiner—Morton Foelak
Assistant Examiner—Jeffrey Culpeper Mullis
Attorney, Agent, or Firm—Phillips Petroleum Co.

[57] ABSTRACT

An arylene sulfide copolymer and a process for preparing same by contacting a mixture of two structurally different dihalomatic compounds, at least one organic amide, at least one sulfur-containing compound, and water, and continuous long fiber reinforced plastics containing arylene sulfide copolymer as the polymer matrix or containing arylene sulfide copolymer in a thermoplastic resin matrix.

12 Claims, No Drawings

PROCESS FOR PREPARING ARYLENE SULFIDE COPOLYMERS

BACKGROUND OF THE INVENTION

This invention relates to arylene sulfide copolymers. In one aspect, this invention relates to a process for the production of arylene sulfide copolymers. In another aspect, this invention relates to reinforced plastics comprising a thermoplastic resin matrix, continuous long fiber reinforcement in the thermoplastic resin matrix, and an arylene sulfide copolymer. In a further aspect, this invention relates to reinforced plastics comprising continuous long fiber reinforcement in an arylene sulfide copolymer matrix.

A wide variety of engineering thermoplastics have been prepared, many of which are currently produced and marketed on a moderate to large scale. While such engineering thermoplastics are useful in many areas, one property of such polymers which needs to be improved is the interfacial adhesion between the engineering thermoplastic and fiber reinforcement. Engineering thermoplastics frequently form a continuous matrix for reinforcing agents and fillers which are added to alter the properties of the polymers before they are shaped into useful articles such as electrical and automotive parts. Engineering thermoplastics having improved mechanical properties as a result of improved interfacial adhesion between the engineering thermoplastic and the fiber reinforcement are desirable.

Arylene sulfide sulfone and arylene sulfide ketone polymers are engineering thermoplastics of potential commercial interest for film, fiber, molding, and composite applications because of their high temperature properties. In fiber reinforced applications, it would be desirable to have an arylene sulfide sulfone or arylene sulfide ketone polymer which exhibits improved interfacial adhesion properties. Incorporation of arylene sulfide copolymers of the invention into arylene sulfide sulfone and arylene sulfide ketone polymers provides a mean for achieving improved interfacial adhesion properties without sacrificing the ability of the polymer to withstand high use temperatures.

SUMMARY OF THE INVENTION

It is an object of the invention to provide a process for producing arylene sulfide copolymers exhibiting good interfacial adhesion properties. It is a further object of the invention to provide a process for producing arylene sulfide copolymers for use in reinforced plastics having a thermoplastic matrix to improve the interfacial adhesion properties between the thermoplastic and the fiber reinforcement. It is a still further object of the invention to provide a process for producing arylene sulfide copolymers for use as the matrix in reinforced plastics.

According to the invention, a process for preparing arylene sulfide copolymers is provided which comprises contacting at least one dihaloaromatic compound selected from the group consisting of dihaloaromatic sulfones and dihaloaromatic ketones, at least one dihaloaromatic compound represented by the formula

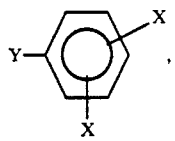

at least one organic amide, at least one sulfur-containing compound, and water wherein X and Y are defined herein.

Further according to the invention, a reinforced plastic is provided which comprises a thermoplastic resin matrix wherein the thermoplastic resin is selected from the group consisting of an arylene sulfide sulfone polymer and an arylene sulfide ketone polymer, continuous long fiber reinforcement embedded in the matrix, and an arylene sulfide copolymer comprising units having the structure

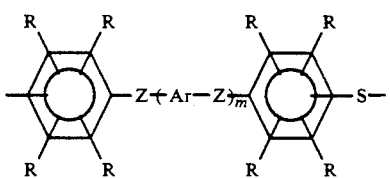

and units having the structure

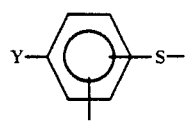

wherein said arylene sulfide copolymer is present in an amount sufficient to improve interfacial adhesion between the thermoplastic resin matrix and the continuous long fiber reinforcement and wherein Y, Ar, Z, m and R are as defined herein. In another embodiment, a reinforced plastic is provided which comprises continuous long fiber reinforcement in an arylene sulfide copolymer matrix wherein the arylene sulfide copolymer is as defined above.

Further according to the invention, an arylene sulfide copolymer composition is provided having arylene sulfide sulfone and/or arylene sulfide ketone units, and arylene sulfide units having the formula

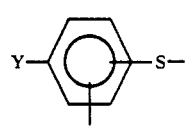

wherein Y is as defined herein, such that the arylene sulfide copolymer can be characterized as an irregular polymer. As used herein, the term "irregular polymer" is meant to represent a polymer whose molecules cannot be described by only one species of repeating unit in a single sequential arrangement. The polymers produced by the process of the invention include arylene sulfide sulfone and/or arylene sulfide ketone units, and arylene sulfide units having the structure

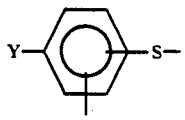

in the backbone. These units can be alternating in any sequence and in sequences such that blocks of a repeating unit are present.

DETAILED DESCRIPTION OF THE INVENTION

This invention relates to a process for preparing arylene sulfide copolymers comprising contacting: (a) at least one dihaloaromatic compound selected from the group consisting of dihaloaromatic sulfones and dihaloaromatic ketones, (b) at least one dihaloaromatic compound represented by the formula

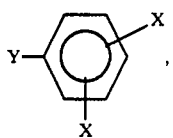

wherein X and Y are defined herein, (c) at least one organic amide, (d) at least one sulfur-containing compound, and (e) water. The arylene sulfide copolymers made according to this invention are readily recoverable and well suited for applications in which such engineering thermoplastics are commonly used.

Dihaloaromatic sulfones and dihaloaromatic ketones employed in the process of the invention can be represented by the formula

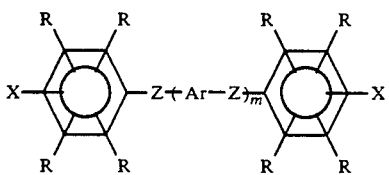

wherein each X is selected from the group consisting of fluorine, chlorine, bromine, and iodine, Z is selected from the group consisting of —CO— and —SO$_2$—, Ar is a divalent radical selected from the group consisting of

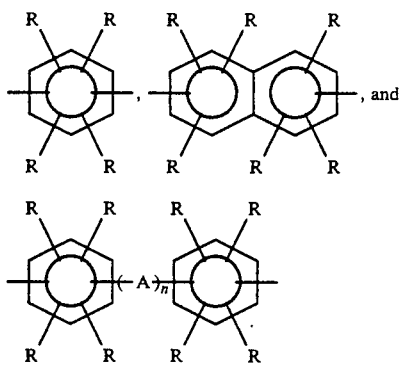

wherein m is 0 or 1, n is 0 or 1, A is selected from the group consisting of oxygen, sulfur, sulfonyl, carbonyl and CR$_2$ wherein each R is selected from the group consisting of hydrogen and alkyl radicals having 1 to about 4 carbon atoms, the total number of carbon atoms in all of the R groups in the molecule being 0 to about 12.

Examples of some dihaloaromatic sulfones that can be employed in the process of the invention include bis(4-fluorophenyl)sulfone, bis(4-chlorophenyl)sulfone, bis(4-bromophenyl)sulfone, bis(4-iodophenyl)sulfone, p-chlorophenyl p-bromophenyl sulfone, p-iodophenyl 3-methyl-4-fluorophenyl sulfone, bis(2-methyl-4-chlorophenyl)sulfone, bis(2,5-diethyl-4-bromophenyl)sulfone, bis(3-isopropyl-4-iodophenyl)sulfone, bis(2,5-dipropyl-4-chlorophenyl)sulfone, bis(2-butyl-4-fluorophenyl)sulfone, bis(2,3,5,6-tetramethyl-4-chlorophenyl)sulfone, 2-isobutyl-4-chlorophenyl 3-butyl-4-bromophenyl sulfone, 1,4-bis(p-chlorophenyl sulfonyl)benzene, 1-methyl-2,4-bis(p-fluorophenyl Z sulfonyl)benzene, 2,6-bis(p-bromophenyl sulfonyl)napthalene, 7-ethyl-1,5-bis(p-iodophenyl sulfonyl)napthalene, 4,4'-bis(p-chlorophenyl sulfonyl) biphenyl, bis[p-(p-bromophenyl sulfonyl)phenyl]ether, bis[p-(p-chlorophenyl sulfonyl)phenyl]sulfide, bis[p-(p-chlorophenyl sulfonyl)phenyl]sulfone, bis[p-(p-bromophenyl sulfonyl)phenyl]methane, 5,5-bis[3-ethyl-4-(p-chlorophenyl sulfonyl)phenyl]nonane and the like and mixtures thereof. The presently preferred dihaloaromatic sulfone is bis(4-chlorophenyl)sulfone because of its effectiveness and commercial availability.

Examples of some dihaloaromatic ketones that can be employed in the process of the invention include 4,4'-dichlorobenzophenone, 4,4'-difluorobenzophenone, 4,4'-dibromobenzophenone, 4,4'-diiodobenzophenone, 4-chloro-4'-fluorobenzophenone, 1,4-bis-(4-fluorobenzoyl)benzene, 1,4-bis-(4-chlorobenzoyl)benzene, 1-(4-chlorobenzoyl)-4-(4-fluorobenzoyl)benzene, bis[4-(4-chlorobenzoyl)phenyl]thioether, bis(2,3,5,6-tetramethyl-4-chlorophenyl)ketone, bis[4-(4-chlorobenzoyl)-phenyl]ether, 4,4'-bis-(4-chlorobenzoyl)biphenyl, and the like, and mixtures thereof. The presently preferred dihaloaromatic ketone is 4,4'-dichlorobenzophenone because of its effectiveness and commercial availability.

Dihalomatic compounds of the formula (I) employed in the process of the invention can be represented by the formula

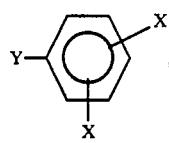

wherein X is as defined above and Y is selected from the group consisting of

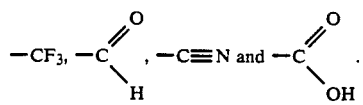

Examples of some dihaloaromatic compounds of formula (I) that can be employed in the process of the invention include 2,4-dichlorobenzotrifluoride, 2,5-dichlorobenzotrifluoride, 3,4-dichlorobenzotrifluoride, 2,4-difluorobenzotrifluoride, 2,4-dibromobenzotrifluoride, 2,4-diiodobenzotrifluoride, 2,4-dichlorobenzaldehyde, 3,5-dichlorobenzaldehyde, 3,4-dichlorobenzaldehyde, 2,4-difluorobenzaldehyde, 2,6-difluorobenzaldehyde, 2,5-difluorobenzaldehyde, 2,4-dibromobenzaldehyde, 2,4-diiodobenzaldehyde, 2,6-dichlorobenzonitrile, 3,5-dichlorobenzonitrile, 2,4-difluorobenzonitrile, 2,5-difluorobenzonitrile, 2,6-difluorobenzonitrile, 2,6-dibromobenzonitrile, 2,6-diiodobenzonitrile, 2,5-dichlorobenzoic acid, 2,4-dichlorobenzoic acid, 2,6-dichlorobenzoic acid, 3,5-dichlorobenzoic acid, 2,4-difluorobenzoic acid, 2,5-difluorobenzoic acid, 2,6-difluorobenzoic acid, 2,5-dibromobenzoic acid, 2,5-diiodobenzoic acid and mixtures thereof. The presently preferred dihaloromatic compounds of formula (I) are 2,4-dichlorobenotrifluoride, 2,4-dichlorobenzaldehyde, and 2,6-dichlorobenzonitrile because of their effectiveness and good results obtained therewith.

The total amount of dihaloaromatic compound employed in the invention depends upon the amount of sulfur-containing compound employed. The total amount of dihaloaromatic compound can be expressed in terms of a molar ratio of the sum of the dihaloaromatic compounds to sulfur-containing compound as defined herein and will generally be about 0.7:1 to about 1.3:1. Preferably, this molar ratio is about 0.9:1 to about 1.15:1.

The amount of dihaloaromatic compound of formula (I) can be expressed in terms of a mole percent based on the total dihaloaromatic compounds employed. Generally, the amount of dihaloaromatic compound of formula (I) will be about 1 to about 40 mole percent, preferably about 3 to about 20 mole percent, and most preferably about 5 to about 10 mole percent.

The organic amides used in the process of the invention should be substantially liquid at the reaction temperature and pressure employed. The amides can be cyclic or acyclic and can have 1 to about 10 carbon atoms per molecule. Examples of some suitable organic amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N-ethyl-2-pyrrolidone, N-cyclohexyl-2-pyrrolidone, N-dodecyl-3-octyl-2-pyrrolidone, N,N'-ethylene di-2-pyrrolidone, hexamethylphosphoramide, tetramethylurea, and the like, and mixtures thereof.

The amount of organic amide employed according to the invention can be expressed in terms of molar ratio based on the sulfur-containing compound employed. Broadly, the molar ratio of organic amide to sulfur-containing compound as defined herein will be about 2:1 to about 24:1, preferably about 4:1 to about 16:1. N-methyl-2-pyrrolidone is especially preferred because of excellent results obtained therewith and ready availability.

In accordance with the invention, suitable sulfur-containing compounds which can be employed in the production of the arylene sulfide copolymers are selected from the group consisting of alkali metal sulfides, alkali metal bisulfides, and hydrogen sulfide. Suitable alkali metal sulfides include lithium sulfide, sodium sulfide, potassium sulfide, rubidium sulfide, cesium sulfide and mixtures thereof. The alkali metal sulfide can be used in anhydrous form, as a hydrate, or as an aqueous mixture. Sodium sulfide is preferred because of ready availability and good results obtained therewith. Suitable alkali metal bisulfides include lithium bisulfide, sodium bisulfide, potassium bisulfide, rubidium bisulfide, cesium bisulfide and mixtures thereof. Sodium bisulfide is preferred because of ready availability and good results obtained therewith. The alkali metal bisulfide can conveniently be utilized in the process of the invention as an aqueous solution. For example, an aqueous solution of sodium bisulfide having about 60 weight percent sodium bisulfide is convenient to use.

If a dihaloaromatic sulfone is used, the amount of water employed according to the invention can be expressed in terms of molar ratio based on the organic amide employed. Broadly, the molar ratio of organic amide to water will be from about 0.4:1 to about 1.6:1, preferably about 0.45:1 to about 1.3:1, and most preferably from about 0.5:1 to about 1.2:1.

If a dihaloaromatic ketone is used, the amount of water employed according to the invention can be expressed in terms of molar ratio based on the sulfur-containing compound initially charged. Broadly, the molar ratio of water to sulfur-containing compound will be from about 3.5:1 to about 7:1, preferably about 4.5:1 to about 6:1, and most preferably about 4.7:1 to about 5.7:1.

In a preferred embodiment, a polymerization modifier such as an alkali metal carboxylate is employed in the process of the invention. Alkali metal carboxylate that can be employed in the process of the invention can be represented by the formula $R'CO_2M$ where $R'$ is a hydrocarbyl radical selected from alkyl, cycloalkyl, and aryl and combinations thereof such as alkaryl, aralkyl, and the like, the number of carbon atoms in $R'$ being within the range of 1 to about 20, and M is an alkali metal selected from the group consisting of lithium, sodium, potassium, rubidium and cesium. Examples of some alkali metal carboxylates that can be employed in the process of the invention include lithium acetate, sodium acetate, potassium acetate, lithium propionate, sodium propionate, lithium 2-methyl-propionate, rubidium butyrate, lithium valerate, sodium valerate, cesium hexanoate, lithium heptanoate, lithium 2-methyl-octanoate, potassium dodecanoate, rubidium 4-ethyltetra- decanoate, sodium octadecanoate, sodium heneicosanoate, lithium cyclohexane carboxylate, cesium cyclododecane carboxylate, sodium 3-methylcyclopentane carboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate and the like and mixtures thereof. The presently preferred alkali metal carboxylate is sodium acetate because of its effectiveness, economics and commercial availability.

The amount of alkali metal carboxylate employed according to the invention can be expressed in terms of molar ratio based on the sulfur-containing compound employed. Broadly, the molar ratio of alkali metal carboxylate to sulfur-containing compound will be from about 0.002:1 to about 2:1, preferably about 0.05:1 to about 1.1:1, and most preferably about 0.98:1 to about 1.02:1.

In a further preferred embodiment, a base selected from the group consisting of alkali metal hydroxide, alkali metal carbonate, and mixtures of at least one alkali metal hydroxide with at least one alkali metal carbonate is employed when the sulfur-containing compound is an alkali metal bisulfide or hydrogen sulfide.

Alkali metal hydroxides that can be employed according to the invention include lithium hydroxide, sodium hydroxide, potassium hydroxide, rubidium hydroxide, cesium hydroxide, and mixtures thereof. Sodium hydroxide is preferred because of ready availability and good results obtained using this compound. The alkali metal hydroxide can conveniently be used in the process of the invention as an aqueous solution. For example, an aqueous solution of sodium hydroxide having about 50 weight percent sodium hydroxide is convenient to use.

Alkali metal carbonates that can be employed according to the invention include lithium carbonate, sodium carbonate, potassium carbonate, rubidium carbonate, cesium carbonate, and mixtures thereof. Sodium carbonate is preferred because of ready availability and generally good results obtained therewith.

If a mixture of at least one alkali metal hydroxide and at least one alkali metal carbonate is employed, the mixture should contain at least about 5 mole percent alkali metal carbonate. Preferably, the mixture will have about 20 to about 90 mole percent alkali metal carbonate and more preferably about 40 to about 80 mole percent alkali metal carbonate.

When an alkali metal hydroxide is employed, it is convenient to express the amount of alkali metal hydroxide employed in terms of a molar ratio of alkali metal hydroxide to sulfur-containing compound. Broadly, the molar ratio of alkali metal hydroxide to sulfur-containing compound will be from about 0.05:1 to about 4:1, preferably about 0.5:1 to about 2.05:1. Alternately, the amount of alkali metal hydroxide employed can be expressed in terms of a ratio of equivalents of alkali metal hydroxide to moles of sulfur-containing compound. Broadly, the ratio of equivalents of alkali metal hydroxide to moles of sulfur-containing compound will be from about 0.5:1 to about 4:1, preferably about 0.5:1 to about 2.05:1.

When an alkali metal carbonate is employed, it is convenient to express the amount of alkali metal carbonate employed in terms of a molar ratio of alkali metal carbonate to sulfur-containing compound. Broadly, the molar ratio of alkali metal carbonate to sulfur-containing compound will be from about 0.025:1 to about 3:1, preferably about 0.25:1 to about 2:1. Alternately, the amount of alkali metal carbonate employed can be expressed in terms of a ratio of equivalents of alkali metal carbonate to moles of sulfur-containing compound. Broadly, the ratio of equivalents of alkali metal carbonate to moles of sulfur-containing compound will be from about 0.05:1 to about 6:1, preferably about 0.5:1 to about 4:1.

When a mixture of at least one alkali metal hydroxide and at least one alkali metal carbonate is employed, it is convenient to express the amount of total base in terms of a ratio of equivalents of base to moles of sulfur-containing compound since one mole of alkali metal hydroxide corresponds to one equivalent of alkali metal hydroxide while one mole of alkali metal carbonate corresponds to two equivalents of alkali metal carbonate. Broadly the ratio of equivalents of total base to moles of sulfur-containing compound will be from about 0.05:1 to about 6:1, preferably about 0.5:1 to about 4:1.

The charged sequence of the various compounds employed in the process of the invention can be varied as desired. One convenient method is to simply charge all the compounds in any desired sequence to a suitable reaction vessel equipped with agitation means at about room temperature and then to heat the mixture with stirring to the desired reaction temperature and to hold the mixture for the desired length of time at the reaction temperature. It is also possible to preheat a mixture of only certain of the compounds in a separate vessel then to charge this mixture to a preheated mixture of the remainder of the compounds in the reaction vessel. For example, an organic amide can be pre-reacted with an alkali metal hydroxide in the presence of water, and this mixture subsequently contacted with the sulfur-containing compound to form a complex comprising these components. The complex is then utilized to contact the dihaloaromatic compounds under suitable polymerization conditions to produce the arylene sulfide copolymer. The reaction temperature at which the polymerization is conducted can vary over a considerable range. When a dihaloaromatic sulfone is employed, generally the reaction temperature will be within the range of about 140° C. to about 240° C., preferably about 185° C. to about 225° C. When a dihaloaromatic ketone is employed, the reaction temperature will generally be within the range of about 175° C. to about 350° C., preferably about 225° C. to about 275° C. The reaction time can vary widely, depending in part on the reaction X temperature employed, but generally will be within the range of about 10 minutes to about 72 hours, preferably about 1 hour to about 4 hours. The pressure should be sufficient to maintain the dihaloaromatic compounds, and other organic compounds present substantially in the liquid phase.

The arylene sulfide copolymers produced by the process of the invention are in particle form and can be separated from the reaction mixture by conventional procedures, e.g. by filtration of the reaction mixture to recover the polymer followed by washing at least once with water. A presently preferred recovery method involves diluting the hot reaction mixture with water or a mixture of water and organic amide, and cooling the diluted mixture while stirring. The separated polymer particles can then be washed with water preferably with at least a portion of the washing being conducted at an elevated temperature within the range of about 130° C. to about 250° C. and then dried to provide a polymer which is low in ash-forming substances and is relatively light in color as well as exhibiting good melt flow stability under conditions of melt processing operations such as injection molding. When a dihaloaromatic sulfone is used in the polymerization of the arylene sulfide copolymer, it is presently preferred to employ a zinc carboxylate salt in the treatment of the recovered arylene sulfide copolymer in at least one of the above-described washing steps to improve the melt flow stability of the polymer. Such a process for treating with a zinc carboxylate salt is described in U.S. Pat. No. 4,774,276 which is hereby incorporated by reference herein. If the arylene sulfide copolymer is treated with a zinc carboxylate salt as described above, it is further preferred that the arylene sulfide copolymer be further treated with an organic acid, particularly acetic acid, during at least one of the above-described washing steps. When a dihaloaromatic ketone is employed in the polymerization of the arylene sulfide copolymer, it is presently preferred to employ a water-soluble calcium cation, preferably a calcium salt such as a calcium halide or a calcium carboxylate in the treatment of the recovered arylene sulfide copolymer in at least one of the above-described washing steps to improve the melt flow stability of the polymer.

The arylene sulfide copolymers produced by the process of this invention can be characterized as irregular polymers, the molecules of which cannot be described by only one species of repeating unit in a single sequential arrangement. The irregular polymers can be characterized as having at least the units within the polymer backbone represented by the following structural formulas:

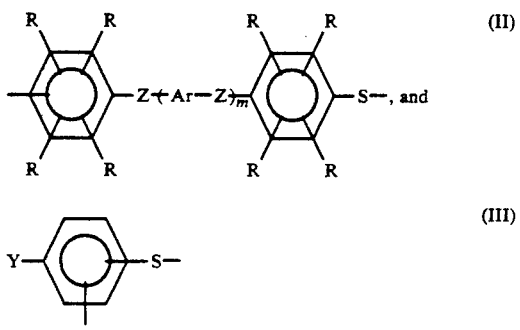

wherein R, Z, Ar, and m are as defined herein. The arylene sulfide copolymers can also have minor amounts of other structural groups present, particularly at the polymer end groups.

The amount of structural units of formula (III) in the polymer can be expressed in terms of a percent based on the sum of the number of units of the structural formula (II) and the number of units of the structural formula (III). Generally, the amount of structural units of the formula (III) is about 1 to about 40 percent, preferably about 3 to about 20 percent, and most preferably about 5 to about 10 percent of the sum of the number of structural units of the formula (II) and the number of structural units of the formula (III).

The arylene sulfide copolymers prepared according to this invention generally exhibit an inherent viscosity at least about 0.05 dL/g, preferably from about 0.1 to about 0.6 dL/g, and most preferably from about 0.2 to about 0.5 dL/g. Inherent viscosity is a measurement of molecular weight which is particularly useful in characterizing arylene sulfide copolymers. As used herein, the term "inherent viscosity" (I.V.) refers to dilute solution viscosity which is the ratio of the natural logarithm of the relative viscosity to the polymer solution concentration in grams per deciliter (g/dL). The relative viscosity is the ratio of the flow time of a specific solution of the polymer to the flow time of the pure solvent. Inherent viscosities for arylene sulfide copolymers are measured generally according to the method described in ASTM D 1243-79 wherein samples of dried polymer are dissolved in a solvent at 30° C. at a polymer concentration of 0.5 grams per deciliter utilizing a No. 100 Cannon-Fenske viscometer. When the arylene sulfide copolymer is produced using a dihaloaromatic sulfone, the solvent utilized is N-methyl-2-pyrrolidone. When the arylene sulfide copolymer is produced using a dihaloaromatic ketone, the solvent utilized is concentrated sulfuric acid.

The arylene sulfide copolymers produced by the process of the invention can be blended with fillers, fibers, pigments, extenders, other polymers and the like. The arylene sulfide copolymers can be cured to provide cured products having high thermal stability and good chemical resistance, wherein curing is defined as a distinct process step after polymer drying comprising a thermal treatment on the polymer in the presence of an oxygen-containing atmosphere. The preferred oxygen-containing atmosphere is air. The arylene sulfide copolymers of the invention are useful in the production of film, fibers, molded objects, and composites.

In one embodiment, the arylene sulfide copolymers of the invention can be employed as the continuous matrix in continuous long fiber reinforced compositions such as prepregs, laminates and pultruded shapes.

Such fiber reinforced compositions can be prepared by any method known to those of ordinary skill in the art. Examples of such methods are those described in U.S. Pat. Nos. 4,680,224; 4,792,481; and 4,814,224, which are hereby incorporated by reference herein.

In another embodiment, the arylene sulfide copolymers of the invention can be employed in reinforced plastic compositions such as prepregs, laminates and pultruded shapes wherein the reinforced plastic comprises a continuous matrix of a thermoplastic resin selected from the group consisting of an arylene sulfide sulfone polymer and an arylene sulfide ketone polymer.

The arylene sulfide sulfone polymers can be prepared by the process of U.S. Pat. No. 4,808,698, which is incorporated by reference herein, but any process which produces arylene sulfide sulfone polymers is acceptable. The arylene sulfide ketone polymers can be prepared by the process of U.S. Pat. No. 4,795,799 or U.S. Pat. No. 4,812,552, which are incorporated by reference herein, but any process which produces arylene sulfide ketone polymers is acceptable.

The fiber reinforcement can be selected from randomly-oriented loose fibers, fiber mat, and unidirectionally oriented fibers. When a fiber mat is employed as the fibrous reinforcing material, it is preferably provided in the form of woven fiber mat, chopped fiber mat, continuous strand mat or non-woven fiber mat, the most preferred being chopped fiber mat or continuous strand mat.

The fiber reinforcement can be composed of fibers of glass, carbon, and aramid (aromatic polyamide) and mixtures thereof. The preferred fiber reinforcement comprise fibers of glass, carbon or mixtures thereof. In a further preferred embodiment the fibers are carbon.

Generally, the amount of arylene sulfide copolymer matrix in the fiber reinforced composition is in the range of about 20 to about 95 weight percent of the fully consolidated composition. In one embodiment in which the fiber reinforcement is composed of glass fibers, the arylene sulfide copolymer content is preferably in the range of about 20 to about 60 weight percent. In another embodiment in which the fiber reinforcement is composed of carbon fibers, the arylene sulfide copolymer content is preferably in the range of about 25 to about 60 weight percent of the total composition.

The amount of arylene sulfide copolymer used when an arylene sulfide sulfone polymer or an arylene sulfide ketone polymer is utilized as the thermoplastic resin matrix can conveniently be expressed in terms of a weight percent based on the sum of the arylene sulfide copolymer and the thermoplastic resin in the fiber reinforced composition. Broadly, the amount of arylene sulfide copolymer is about 0.1 to about 20 weight percent, preferably about 0.5 to about 5 weight percent of the sum of the arylene sulfide copolymer and the thermoplastic resin.

Generally, the sum of the arylene sulfide copolymer and the thermoplastic resin matrix in the fiber reinforced compositions is in the range of about 20 to about 95 weight percent of the fully consolidated composition. In one embodiment in which the fiber reinforcement is composed of glass fibers, the sum of the arylene sulfide copolymer and the thermoplastic resin is preferably in the range of about 20 to about 60 weight percent. In another embodiment in which the fiber reinforcement is composed of carbon fibers, the sum of the arylene sulfide copolymer and the thermoplastic resin is preferably in the range of about 25 to about 60 weight percent of the total composition.

EXAMPLES

EXAMPLE I

A series of polymerization runs were performed in a 90 gallon stirred (500 rpm) stainless steel reactor for the preparation of poly(p-phenylene sulfide sulfone) (PPSS) as exemplary of the aromatic sulfide sulfone polymers. The polymerization recipe for these runs is presented below.

| Compound | lb-mole |
| --- | --- |
| Sodium hydrosulfide (NaSH)[a] | 0.32 |
| Sodium hydroxide (NaOH)[b] | 0.24–0.25 |
| Sodium Carbonate (Na$_2$CO$_3$) | 0.09 |
| bis(p-chlorophenyl)sulfone (BCPS) | 0.32 |
| N-methyl-2-pyrrolidone (NMP) | 1.98 |
| Water (H$_2$O)[c] | 1.74 |
| Sodium acetate (NaOAc) | 0.32 |

[a]Charged as an aqueous solution of 58.47 wt. % NaSH and 0.51 wt. % Na$_2$S.
[b]Charged as an aqueous solution of 50.36 wt. % NaOH.
[c]Includes H$_2$O in NaSH and NaOH charges.

In each run the aqueous NaOH and a portion of the NMP were premixed in a separate vessel for 5 hours at 115°–125° C. The aqueous NaSH was then charged and the resulting mixture held for 30 minutes to form a NaSH:NaOH:NMP complex. In the polymerization reactor, BCPS, Na$_2$CO$_3$, NaOAc and a portion of the NMP were charged and heated to approximately 88° C. The admixture containing the complex was then charged to the polymerization reactor with a subsequent flush using the remaining NMP. The reaction mixture was then heated to 200° C. at 1.1°–1.7° C./minute in 56–89 minutes. The reaction mixture was held at 200° C. for 210 minutes.

At the end of polymerization, the agitator speed was increased to 550 rpm and 0.6–1.6 lb-mole NMP and 2.3–2.8 lb-mole water were premixed and added to the reactor. The reaction mixture was then cooled to approx. 107° C. at 1.0°–1.1° C./minute. The resulting polymer slurry was filtered to facilitate recovery of the NMP. The polymer was reslurried in ambient deionized (DI) water and filtered using a hot (82° C.) DI water rinse. The polymer was then given two hot (176° C.) washes using deaerated DI water and filtered using a hot DI water rinse. The washing steps utilized a slurry mixing tank and a nylon fabric filter cloth on a moving horizontal belt filter system to separate the PPSS from the wash/rinse liquid. The washed PPSS from each run was dried and a sample tested for inherent viscosity.

Inherent viscosities for PPSS samples were determined using a #100 Cannon-Fenske routine type viscometer at 30° C. with N-methyl-2-pyrrolidone (NMP) as the solvent at a polymer concentration of 0.5 g per dL NMP. Inherent viscosities provide an indication of relative molecular weights of PPSS polymers of the same type.

A total of 5 runs were made producing 5 batches of poly(phenylene sulfide sulfone) polymers having inherent viscosities ranging from 0.45 to 0.48. Composite samples were made by blending these 5 batches for the preparation of the composite structures in Example V.

EXAMPLE II

This example describes the preparation of poly(phenylene sulfide sulfone) copolymers containing trifluoride functional groups.

A 1-liter stirred, stainless steel autoclave was charged with 103.38 g (0.36 g-mole) bis(4-chlorophenyl)sulfone; 42.82 g (0.404 g-mole) sodium carbonate; 37.73 g (0.4 g-mole) sodium hydrosulfide; 8.60 g (0.04 g-mole) 2,4-dichlorobenzotrifluoride; 37.81 g (0.4 g-mole) sodium acetate; 317.22 g (3.2 g-mole) of N-methylpyrrolidone; and 36.0 g (2.0 g-mole) water. The mixture was heated to 200° C. while agitating and held at 200° C. for 4 hours during which time the pressure increased to 250 psig. Following slow cooling to room temperature, the polymer was removed from the autoclave, washed and filtered 4 times with hot deionized water (70°–90° C.), and then dried in a forced air oven at 108° C. for one day (or until constant weight). The polymer recovered was 96.08 g and had an inherent viscosity of 0.31 measured according to the procedure described above for PPSS.

EXAMPLE III

This example illustrates the preparation of poly(phenylene sulfide sulfone) copolymers containing carboxylic acid functional groups.

The experiment shown in Example II was repeated, with the exception that the 0.04 g-mole of 2,4-dichlorobenzotrifluoride was replaced with 0.02 g-mole of 2,6-dichlorobenzonitrile, 0.38 g-mole of BCPS was charged, and 0.48 g-mole of Na$_2$CO$_3$ was charged with the excess of base used to hydrolyze the nitrile group to a carboxylic acid. The polymer recovered was 95.90 g having an inherent viscosity of 0.50 measured according to the procedure described above for PPSS.

EXAMPLE IV

This example describes the preparation of poly(phenylene sulfide sulfone) copolymers containing aldehyde functional groups.

The experiment is identical to that shown in Example II except that 0.04 g-mole of 2,4-dichlorobenzotrifluoride was replaced with 0.02 g-mole of 2,4-dichlorobenzaldehyde and 0.38 g-mole of BCPS was charged. A total of 93.85 g polymer having an inherent viscosity of 0.51 measured according to the procedure described above for PPSS was recovered.

EXAMPLE V

This example illustrates composite structures prepared from the poly(phenylene sulfide sulfone) described in Example I with and without the poly(phenylene sulfide sulfone) copolymers described in Examples II–IV as sizings.

Polymers were ground to a fine powder with a particle size of less than about 20 microns for preparing a carbon fiber reinforced prepreg structure for later composite production. A small prepreg line containing a carbon fiber creel, polymer slurry bath, drying ovens, heated shaping die, and pull rolls was used to produce a unidirectional, carbon fiber reinforced prepreg.

The polymer slurry bath comprised slurries made by mixing the PPSS, copolymers(quantities shown in Table I) dissolved in 389–487.5 g N-methyl-2-pyrrolidone, with 4 mL of an ethoxylated nonylphenol (Triton X-100) surfactant and 2700 g of water in a blender.

TABLE I

| Prepreg | Poly(phenylene sulfide sulfone) | Slurry Composition for Preparing Prepreg Poly(phenylene sulfide sulfone)-trifluoride | Poly(phenyl sulfide sulfone)-nitrile | Poly(phenylene sulfide sulfone)-aldehyde |
| --- | --- | --- | --- | --- |
| 1 | 280.0 g | — | — | — |
| 2 | 280.0 g | 2.0 g (0.71 wt. %) | — | — |
| 3 | 279.5 g | 12.5 g (4.3 wt. %) | — | — |
| 4 | 279.5 g | — | 2.0 g (0.71 wt. %) | — |
| 5 | 279.5 g | — | 12.5 g (4.3 wt. %) | — |
| 6 | 279.5 g | — | — | 2.0 g (0.71 wt. %) |
| 7 | 279.5 g | — | — | 12.5 g (4.3 wt. %) |

Two tows of continuous carbon fiber reinforcement (12K AS-4) were passed through the aqueous polymer slurry bath at a rate of about 130 centimeters per minute. The wet, polymer impregnated continuous carbon fiber band was pulled through a guide mechanism, a drying section at about 400° C., and a heated (368° C.), 50.8 mm wide shaping die. The products were a tape containing about 66 weight percent carbon fiber.

The prepreg tapes were cut into shorter segments and plied for compression molding in a press employing 16 plies to produce unidirectional laminates for testing. The molding temperature was about 343° C. The mechanical properties of the composites were determined using ASTM D-638 and ASTM D-790 at 24° C. and are shown in Table II.

TABLE II

| | Mechanical Properties of Composites | | | |
| --- | --- | --- | --- | --- |
| | Transverse Tensile | | Longitudinal Tensile | |
| Composite | Strength (KSI) | Modulus (MSI) | Strength (KSI) | Modulus (MSI) |
| 1 | 4.66 | 1.17 | 234.0 | 18.5 |
| 2 | 4.82 | 1.15 | 212.7 | 19.8 |
| 3 | 5.60 | 1.19 | 213.5 | 18.9 |
| 4 | 5.40 | 1.17 | 206.3 | 18.0 |
| 5 | 5.45 | 1.15 | 195.9 | 19.5 |
| 6 | 5.70 | 1.13 | 255.0 | 17.5 |
| 7 | 5.33 | 1.13 | 257.3 | 18.0 |

The results clearly indicate that, in the presence of a small amount of copolymers (2.5 g, composites 4 and 6), the transverse tensile strength of a composite is increased significantly when compared with composite made from carbon fiber and poly(phenylene sulfide sulfone) (composite 1). Although the physical property of the composite made from carbon fiber, 2.5 g copolymer of poly(phenylene sulfide sulfone) and DCBTF, and poly(phenylene sulfide sulfone) only improves slightly (composite 2), it increases significantly when the copolymer level is increased to 12.5 g.

The results demonstrate that the inventive copolymers are useful as sizings to improve the interfacial adhesion of PPSS to carbon fiber as evidenced by transverse tensile strength. The results also demonstrate that the inventive copolymers can be used as sizings without having a significant effect on other mechanical properties of the composite.

That which is claimed is:

1. A process for preparing an arylene sulfide copolymer comprising contacting: (a) at least one dihaloaromatic sulfone, (b) at least one dihaloaromatic compound represented by the formula

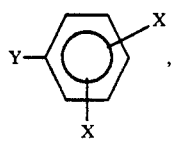

wherein Y is

and X is selected from the group consisting of fluorine, chlorine, bromine and iodine, (c) at least one organic amide, (d) at least one sulfur-containing compound, and (e) water.

2. A process according to claim 1 wherein said dihaloaromatic sulfone is represented by the formula

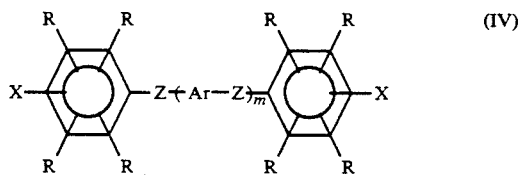

wherein Z is —SO$_2$—, X is selected from the group consisting of fluorine, chlorine, bromine and iodine, Ar is a divalent radical selected from the group consisting of

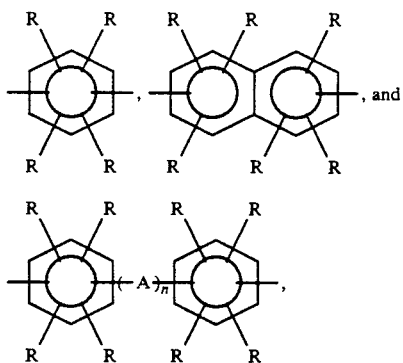

m is 0 or 1, n is 0 or 1, and A is selected from the group consisting of oxygen, sulfur, sulfonyl, carbonyl and CR$_2$ wherein each R is selected from the group consisting of hydrogen and alkyl radicals having 1 to about 4 carbon atoms, the total number of carbon atoms in all of the R groups in the molecule being 0 to about 12.

3. A process according to claim 2 wherein the molar amount of said dihaloaromatic compound of formula (I) is about 1 to about 40 mole percent based on the sum of the number of moles of said dihaloaromatic sulfone of formula (IV) and said dihaloaromatic compound of formula (I).

4. A process according to claim 3 wherein the molar ratio of the sum of said dihaloaromatic compound of formula (I) and said dihaloaromatic sulfone of formula (IV) to said sulfur-containing compound is about 0.7:1 to about 1.3:1 and the molar ratio of said organic amide to said sulfur-containing compound is about 2:1 to about 24:1.

5. A process according to claim 4 wherein said sulfur-containing compound is selected from the group consisting of alkali metal sulfides, alkali metal bisulfides and hydrogen sulfide.

6. A process according to claim 5 further comprising an alkali metal carboxylate having the formula R'CO$_2$M wherein R' is a hydrocarbyl radical containing 1 to about 20 carbon atoms and M is an alkali metal.

7. A process according to claim 6 further comprising a base selected from the group consisting of alkali metal hydroxide, alkali metal carbonate and mixtures of at least one alkali metal hydroxide with at least one alkali metal carbonate.

8. A process according to claim 7 wherein the molar ratio of said organic amide to said water is about 0.4:1 to about 1.6:1.

9. A process according to claim 8 wherein the molar amount of said dihaloaromatic compound of formula (I) is about 3 to about 20 mole percent based on the sum of the number of moles of said dihaloaromatic sulfone and said dihaloaromatic compound of formula (I).

10. A process for producing a phenylene sulfide copolymer comprising contacting: (a) bis(4-chlorophenyl)sulfone, (b) 2,6-dichlorobenzonitrile, (c) N-methyl-2-pyrrolidone, (d) sodium bisulfide, (e) a base selected from the group consisting of sodium hydroxide, sodium carbonate, and mixtures of sodium hydroxide and sodium carbonate, and (f) water, wherein the molar amount of said dihaloaromatic compound (b) is about 5 to about 10 mole percent based on the sum of the number of moles of said bis(4-chlorophenyl)sulfone and said dihaloaromatic compound (b).

11. An arylene sulfide copolymer composition comprising units having the structure

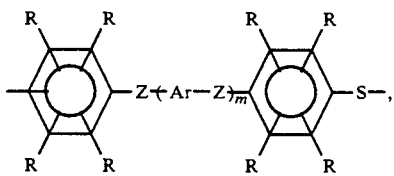 (II)

and units having the structure

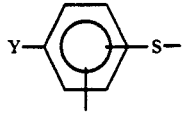 (III)

wherein Y is

—C≡N,

Ar is a divalent radical selected from the group consisting of

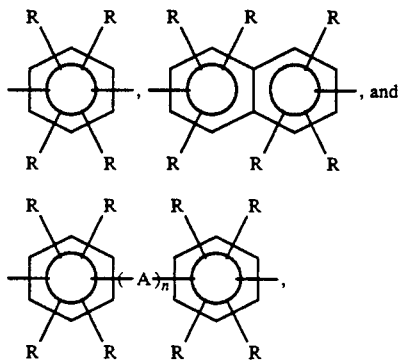

Z is —SO$_2$—, m is 0 or 1, n is 0 or 1, and A is selected from the group consisting of oxygen, sulfur, sulfonyl, carbonyl, and CR$_2$ wherein each R is selected from the group consisting of hydrogen and alkyl radicals having 1 to about 4 carbon atoms, the total number of carbon atoms in all of the R groups in the repeat unit of formula (II) being 0 to about 12.

12. An arylene sulfide copolymer composition according to claim 11 wherein said R is hydrogen, and said m is 0 comprising units having the structure

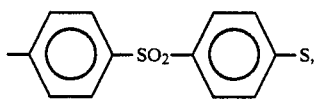

and units having the structure

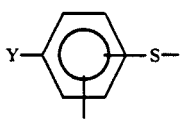 (III)

wherein Y is

—C≡N.

* * * * *